United States Patent
Aoki et al.

(10) Patent No.: US 11,247,741 B2
(45) Date of Patent: Feb. 15, 2022

(54) AUTHENTICATION DEVICE FOR SADDLED VEHICLE

(71) Applicant: HONDA MOTOR CO., LTD., Tokyo (JP)

(72) Inventors: Erina Aoki, Tokyo (JP); Toshifumi Osawa, Tokyo (JP); Seiji Kido, Tokyo (JP); Wataru Ogawa, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/194,749

(22) Filed: Mar. 8, 2021

(65) Prior Publication Data
US 2021/0284264 A1    Sep. 16, 2021

(30) Foreign Application Priority Data

Mar. 11, 2020   (JP) .............................. JP2020-041950

(51) Int. Cl.
| | |
|---|---|
| *B60R 25/04* | (2013.01) |
| *B62H 5/00* | (2006.01) |
| *G08C 17/02* | (2006.01) |
| *B60R 25/24* | (2013.01) |
| *B60R 25/045* | (2013.01) |

(52) U.S. Cl.
CPC .............. *B62H 5/00* (2013.01); *B60R 25/045* (2013.01); *B60R 25/24* (2013.01); *G08C 17/02* (2013.01)

(58) Field of Classification Search
CPC ......... B62H 5/00; B60R 25/045; B60R 25/24; G08C 17/02
See application file for complete search history.

(56) References Cited

U.S. PATENT DOCUMENTS

| | | | | |
|---|---|---|---|---|
| 5,909,921 A | * | 6/1999 | Nesbeth ................. | B60J 7/1621 296/100.1 |
| 5,967,392 A | * | 10/1999 | Niemi ...................... | B60R 9/00 16/289 |
| 6,260,300 B1 | * | 7/2001 | Klebes .................. | F41A 17/066 206/317 |
| 6,409,064 B1 | * | 6/2002 | Bayley ..................... | B60R 9/00 220/211 |
| 2004/0090307 A1 | * | 5/2004 | Konno .................... | B60R 25/04 340/5.62 |
| 2004/0118889 A1 | * | 6/2004 | Hamilton .................. | B62J 9/00 224/413 |
| 2008/0150676 A1 | * | 6/2008 | Ennis ....................... | B25H 3/02 340/5.1 |

(Continued)

FOREIGN PATENT DOCUMENTS

JP          2007-099050 A       4/2007

*Primary Examiner* — Munear T Akki
(74) *Attorney, Agent, or Firm* — Carrier Blackman & Associates, P.C.; Joseph P. Carrier; William D. Blackman

(57) ABSTRACT

The authentication device for saddled vehicle applied to a saddled vehicle including a FOB key that transmits an authentication signal, a control unit that receives and authenticates the authentication signal, a kick starter that starts an engine, and a generator that rotates in conjunction with an operation on the kick starter is configured such that, due to operating the kick starter, the engine is started, and electric power generated by the generator is supplied to the control unit, wherein the control unit stops the engine when the authentication signal is not authenticated before a lapse of a first predetermined time after the control unit is started.

3 Claims, 4 Drawing Sheets

(56) References Cited

U.S. PATENT DOCUMENTS

| | | | | |
|---|---|---|---|---|
| 2009/0242307 | A1* | 10/2009 | Miyabe | B60T 7/042 180/230 |
| 2010/0319666 | A1* | 12/2010 | Usukura | F02P 11/02 123/631 |
| 2011/0040434 | A1* | 2/2011 | Kishibata | B60L 50/16 701/22 |
| 2012/0200106 | A1* | 8/2012 | Villano | B60R 11/06 296/37.6 |
| 2012/0212322 | A1* | 8/2012 | Idsoe | G07C 9/00944 340/5.53 |
| 2012/0248773 | A1* | 10/2012 | Whinnery | F02N 11/0866 290/46 |
| 2016/0075272 | A1* | 3/2016 | Cermak | B60Q 1/00 340/426.15 |
| 2018/0178754 | A1* | 6/2018 | Yamamoto | B60R 25/04 |
| 2019/0032746 | A1* | 1/2019 | Tomura | B60G 17/04 |

* cited by examiner

AUTHENTICATION DEVICE FOR SADDLED VEHICLE

TECHNICAL FIELD

The present invention relates to an authentication device for saddled vehicle, and more particularly to an authentication device for saddled vehicle that authenticates an authentication signal transmitted from a FOB key by a control device provided on a vehicle body.

BACKGROUND ART

Conventionally, an authentication device for saddled vehicle has been known which, upon startup of an engine of the vehicle, gives permission to start the engine by authenticating an authentication signal transmitted from a FOB key (smart key) by a control device of the vehicle.

Patent Literature 1 discloses an authentication device for saddled vehicle in which a reception antenna for receiving an authentication signal transmitted from a FOB key is separated from a control unit and is provided near a seat, for example.

CITATION LIST

Patent Literature

Patent Literature 1: JP 2007-99050 A

SUMMARY OF INVENTION

Technical Problem

Here, in order to receive and authenticate the authentication signal transmitted from the FOB key, it is necessary that the control device is driven by being supplied with power. Therefore, in a vehicle in which a battery is in a discharged state or in a vehicle not equipped with a battery, the control device cannot be activated before starting the engine, so that it is impossible to authenticate the authentication signal.

It is considered that, in a vehicle in which a battery is in a discharged state or in a vehicle not equipped with a battery, an engine is started by a kick starter. However, in a state where the authentication signal is not authenticated, an ignition switch is normally locked, and therefore, a driver needs to perform an operation of authenticating the authentication signal using power generated by the first kick operation to thereby unlock the ignition switch, then, switching the ignition switch to an on position, and starting the engine by the second kick operation. In other words, two kick operations in total are needed.

On the other hand, if permission to start the engine is given to the engine without operating the ignition switch in order to start the engine by one kick operation, there arises a problem that the engine startup is completed even if a person who does not have the FOB key performs the kick operation.

An object of the present invention is to address the abovementioned problem of the conventional prior art, and to provide an authentication device for saddled vehicle capable of supplying power to a control device and completing engine startup by one operation on a kick starter by an owner of a FOB key.

Solution to Problem

In order to achieve the abovementioned object, in accordance with a first feature of the present invention, an authentication device for saddled vehicle applied to a saddled vehicle (1) including a FOB key (70) that transmits an authentication signal, a control unit (30) that receives and authenticates the authentication signal, a kick starter (14) that starts an engine (E), and a generator (50) that rotates in conjunction with an operation on the kick starter (14) is configured such that, due to operating the kick starter (14), electric power generated by the generator (50) is supplied to the control unit (30), and the engine (E) is started, wherein the control unit (30) stops the engine (E) when the authentication signal is not authenticated before a lapse of a first predetermined time (T1) after the control unit (30) is activated.

In accordance with a second feature, the saddled vehicle (1) is provided with a locking mechanism (60) that locks an ignition switch (35) at an off position, the locking mechanism (60) releases lock of the ignition switch (35) when the authentication signal is authenticated, and the control unit (30) stops the engine (E) when the ignition switch (35) is not switched to an on position before a lapse of a second predetermined time (T2) after the lock is released.

Furthermore, in accordance with a third feature, the first predetermined time (T1) is set shorter than the second predetermined time (T2).

Advantageous Effects of Invention

According to the first feature, the authentication device for saddled vehicle applied to a saddled vehicle (1) including a FOB key (70) that transmits an authentication signal, a control unit (30) that receives and authenticates the authentication signal, a kick starter (14) that starts the engine (E), and a generator (50) that rotates in conjunction with an operation on the kick starter (14) is configured such that, due to operating the kick starter (14), electric power generated by the generator (50) is supplied to the control unit (30), and the engine (E) is started, wherein the control unit (30) stops the engine (E) when the authentication signal is not authenticated before a lapse of a first predetermined time (T1) after the control unit (30) is activated. Therefore, the engine is routinely started by the operation on the kick starter, and when a person who does not carry the FOB key operates, the engine is stopped. Thus, in a vehicle in which a battery is in a discharged state or in a vehicle not equipped with a battery, the startup of the engine can be completed by one kick operation by an owner of the FOB key.

According to the second feature, the saddled vehicle (1) is provided with a locking mechanism (60) that locks an ignition switch (35) at an off position, the locking mechanism (60) releases lock of the ignition switch (35) when the authentication signal is authenticated, and the control unit (30) stops the engine (E) when the ignition switch (35) is not switched to an on position before a lapse of a second predetermined time (T2) after the lock is released. Therefore, when the ignition switch is not switched to the on position, it can be determined that a rider has no intension of driving, and unnecessary fuel consumption can be suppressed by stopping the engine.

According to the third feature, the first predetermined time (T1) is set shorter than the second predetermined time (T2). Therefore, when the authentication signal is not authenticated, the engine is stopped immediately, whereby it is possible to save fuel. Further, it is also possible to allow the rider adequate time to operate the ignition switch after the authentication of the FOB key.

DESCRIPTION OF EMBODIMENTS

Figure 1:
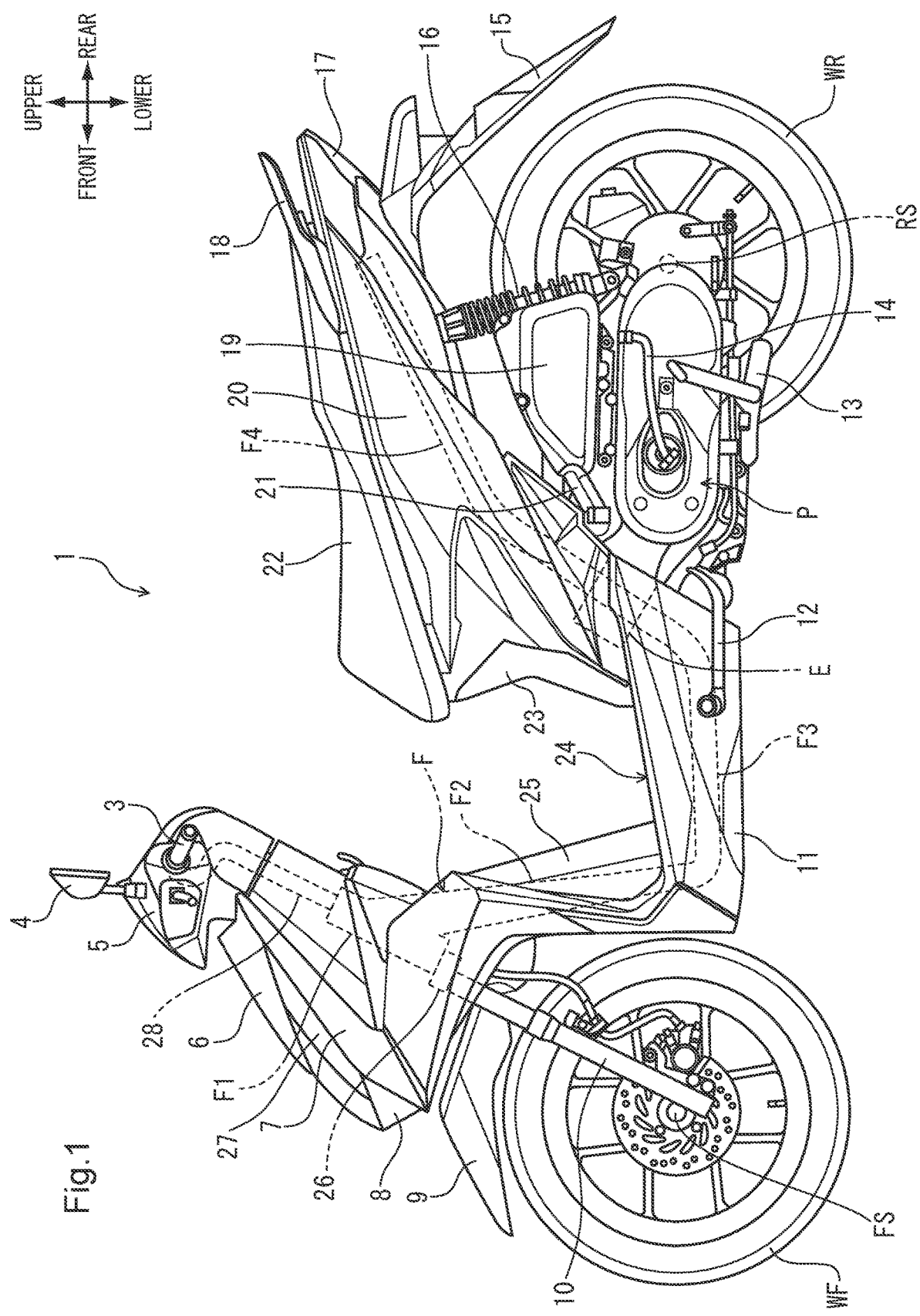
FIG. 1 is a left side view of a motorcycle according to an embodiment of the present invention.

A preferred embodiment of the present invention will be described below in detail with reference to the drawings. FIG. 1 is a left side view of a motorcycle 1 according to an embodiment of the present invention. The motorcycle 1 is a scooter type saddled vehicle including, between a steering handle 3 and a seat 22, a low floor 24 on which driver's feet are put.

A head pipe F1 for rotatably supporting a steering stem 28 is provided at the front end of a vehicle body frame F. The vehicle body frame F includes a main frame F2 extending rearward and downward from the head pipe F1, a pair of right and left under frames F3 extending from the lower end of the main frame F2 to the rear of the vehicle body, and a rear frame F4 extending rearward and upward from the under frame F3.

A bottom bridge 26 for supporting a front fork 10 that supports a front wheel WF in a rotatable manner by a front wheel axle FS is fixed to the lower end of the steering stem 28. The steering handle 3 extending in the width direction of the motorcycle is fixed to the upper end of the steering stem 28. The front part and the rear part of the steering handle 3 are covered with a handle cover 5 that supports a meter device. A front fender 9 that covers the front wheel WF from above is attached to the front fork 10.

A headlight 8 and a pair of right and left flasher lamps 27 are supported between a center cowl 6 provided at the center in the width direction and a pair of right and left front side cowls 7 in the width direction. The center cowl 6 and the front side cowls 7 are provided in front of the steering stem 28. A floor panel 25 facing the legs of the driver is connected to the front side cowls 7 on the rear side of the vehicle body.

The front lower side of the seat 22 is covered with a seat lower panel 23, and a rear cowl 20 covering the right and left sides of the rear frame F4 in the width direction is connected to the rear side of the seat lower panel 23. A unit swing type power unit P obtained by integrating an engine E and a transmission is supported at a rear end position of the under frame F3 so as to be swingable. A rear end part of the power unit P rotatably supporting a rear wheel WR by a rear wheel axle RS is suspended from the rear frame F4 by a rear cushion 16.

A center stand 13 is attached to the lower part of the power unit P, and a kick starter 14 for starting the power unit P with the foot of a rider is attached to the left side face of the power unit P in the width direction. An air cleaner box 19 is disposed above the power unit P.

An under cowl 11 that covers the lateral part and the bottom part of the under frame F3 is connected to the right and left sides of the low floor 24 in the width direction. A side stand 12 supported by the under frame F3 is provided on the left side of the under cowl 11 in the width direction. A pillion step 21 supported by the rear frame F4 is disposed in front of the air cleaner box 19. A rear grip 18 supported by the rear frame F4 is disposed at the rear of the seat 22, and a taillight device 17 is disposed at the rear end of the rear cowl 20. A rear fender 15 is disposed below the taillight device 17.

Figure 2:
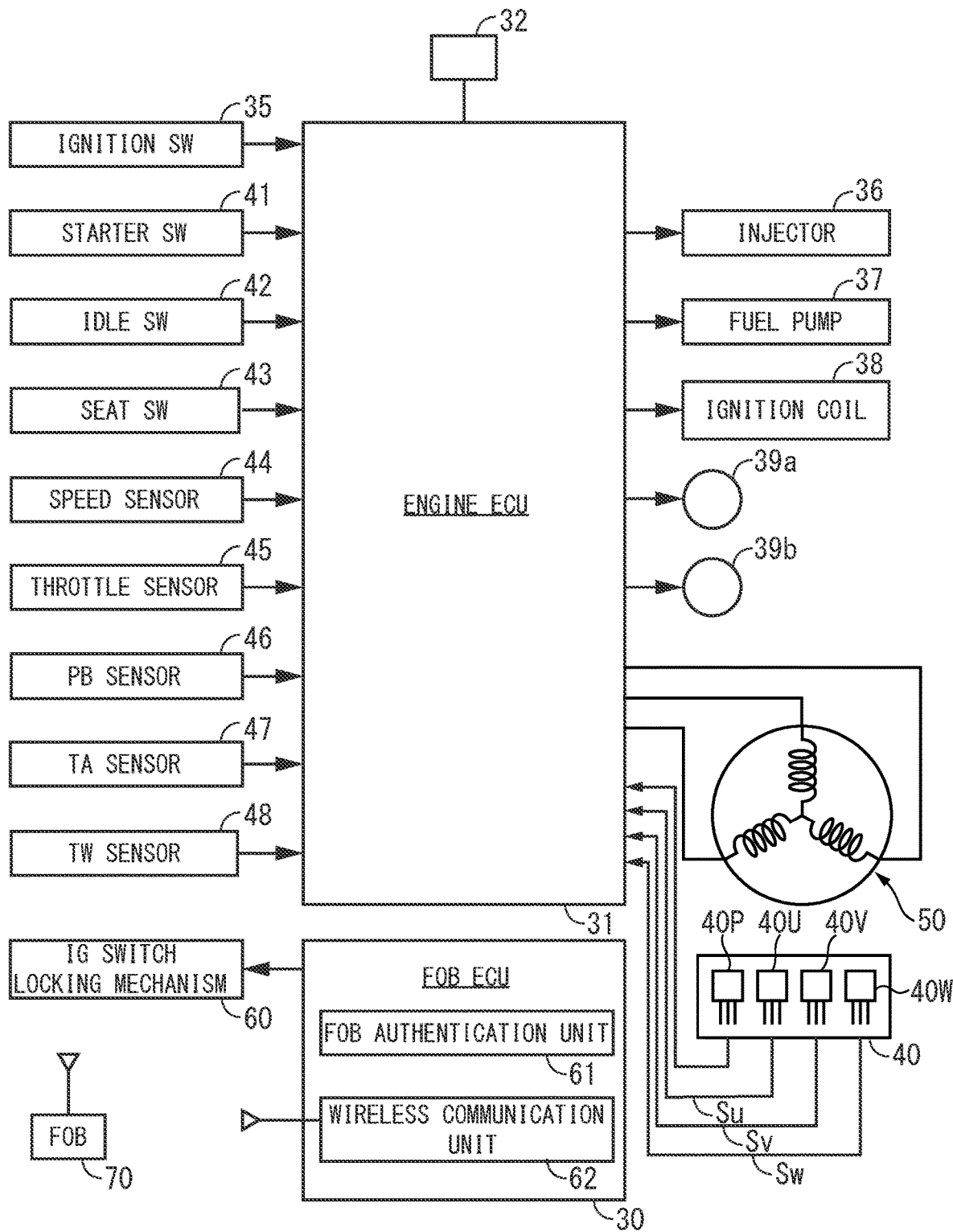
FIG. 2 is a block diagram showing a configuration of an authentication device according to the present invention.

FIG. 2 is a block diagram showing a configuration of an authentication device according to the present invention. An ACG starter motor 50 as an AC generator serving also as a starter is connected to an engine ECU 31. The ACG starter motor 50 is supplied with a drive current from a battery 32. The drive current is supplied from the battery 32 to an injector 36, a fuel pump 37, an ignition coil 38, a standby indicator 39a used for idling stop control, and an alarm indicator 39b. Although the present embodiment includes the engine ECU 31 and a FOB ECU 30, they may be integrated into a single ECU.

The ACG starter motor 50 is connected to a crankshaft C of the engine E. A rotor position or crank angle of the ACG starter motor 50 is detected by a U-phase sensor 40U, a V-phase sensor 40V, and a W-phase sensor 40W mounted on a rotor sensor unit 40. The rotor sensor unit 40 is also provided with a PCB sensor 40P for detecting a compression top dead center and an exhaust top dead center.

The motorcycle 1 is configured to start the engine E by rotating the crankshaft C by the ACG starter motor 50, and to start the engine E by rotating the crankshaft C by kicking the kick starter 14. The ACG starter motor 50 is connected to the crankshaft C of the engine E. Therefore, when the kick starter 14 is operated, the crankshaft C rotates, and power generated by the ACG starter motor 50 is generated.

The engine ECU 31 is connected to various switches and sensors such as an ignition switch (SW) 35, a starter switch 41 for cranking the engine E by the ACG starter motor 50, an idle switch 42 for manually permitting or limiting idling of the engine E, a seat switch 43 for detecting whether or not a driver is seated on the seat 22, a speed sensor 44 for detecting a traveling speed, a throttle sensor 45 for detecting a throttle opening, a PB sensor 46 for detecting an intake negative pressure, a TA sensor 47 for detecting an atmospheric temperature, and a TW sensor 48 for detecting a cooling water temperature.

An automatic idling stop function has an operation mode in which idling is permitted and an operation mode in which idling is restricted or prohibited. In the operation mode in which idling is permitted, idling after the engine is initially started by turning on the ignition switch is temporarily permitted for the purpose of, for example, warm-up operation upon the engine startup. In addition, idling is also permitted by turning on the idle switch 42 even in a case other than the initial engine startup. On the other hand, in the operation mode in which idling is restricted or prohibited, the engine is automatically stopped in response to a predetermined stopping condition, and then, the engine is automatically restarted to allow the vehicle to start when, for example, a throttle grip is opened as a predetermined starting operation.

The motorcycle 1 according to the present embodiment includes a FOB key 70 as a portable wireless key. The FOB ECU 30 includes a wireless communication unit 62 for performing wireless communication with the FOB key 70, and a FOB authentication unit 61 for performing authentication of the FOB key 70 by decoding an authentication signal transmitted by wireless communication. The FOB ECU 30 also controls driving of an IG switch (ignition switch) locking mechanism 60. The ignition switch 35 is, for example, a rotary knob provided in the vicinity of the steering handle 3. The IG switch locking mechanism 60 has a function of locking the rotation of the ignition switch 35 by a retractable locking pin and releasing the lock in response to completion of authentication of the FOB key 70.

The FOB ECU 30 is constantly supplied with power from the battery 32 via the engine ECU 31, and even when the ignition switch 35 is in the off position, the wireless communication unit 62 and the FOB authentication unit 61 are capable of being driven. Thus, the FOB key 70 is authenticated, triggered by the driver who carries the FOB key 70 touching the ignition switch 35, and the lock of the ignition switch 35 is released.

However, when the battery 32 is low in power, i.e., when the battery is dead, or when the vehicle does not have the battery 32, the power from the battery 32 is not supplied, so that the engine ECU 31 and the FOB ECU 30 cannot be driven, resulting in that the FOB key 70 cannot be authenticated.

In view of this, in the authentication device for saddled vehicle according to the present embodiment, electric power generated by the operation performed on the kick starter 14 is supplied to drive the engine ECU 31 and the FOB ECU 30. This enables startup of the engine E and the authentication of the FOB key 70 even when the battery is dead, or the vehicle is not equipped with the battery. If the kick starter 14 is operated by a person who does not carry the FOB key 70, the engine E is started once, but is stopped immediately unless the FOB key 70 is authenticated.

Figure 3:
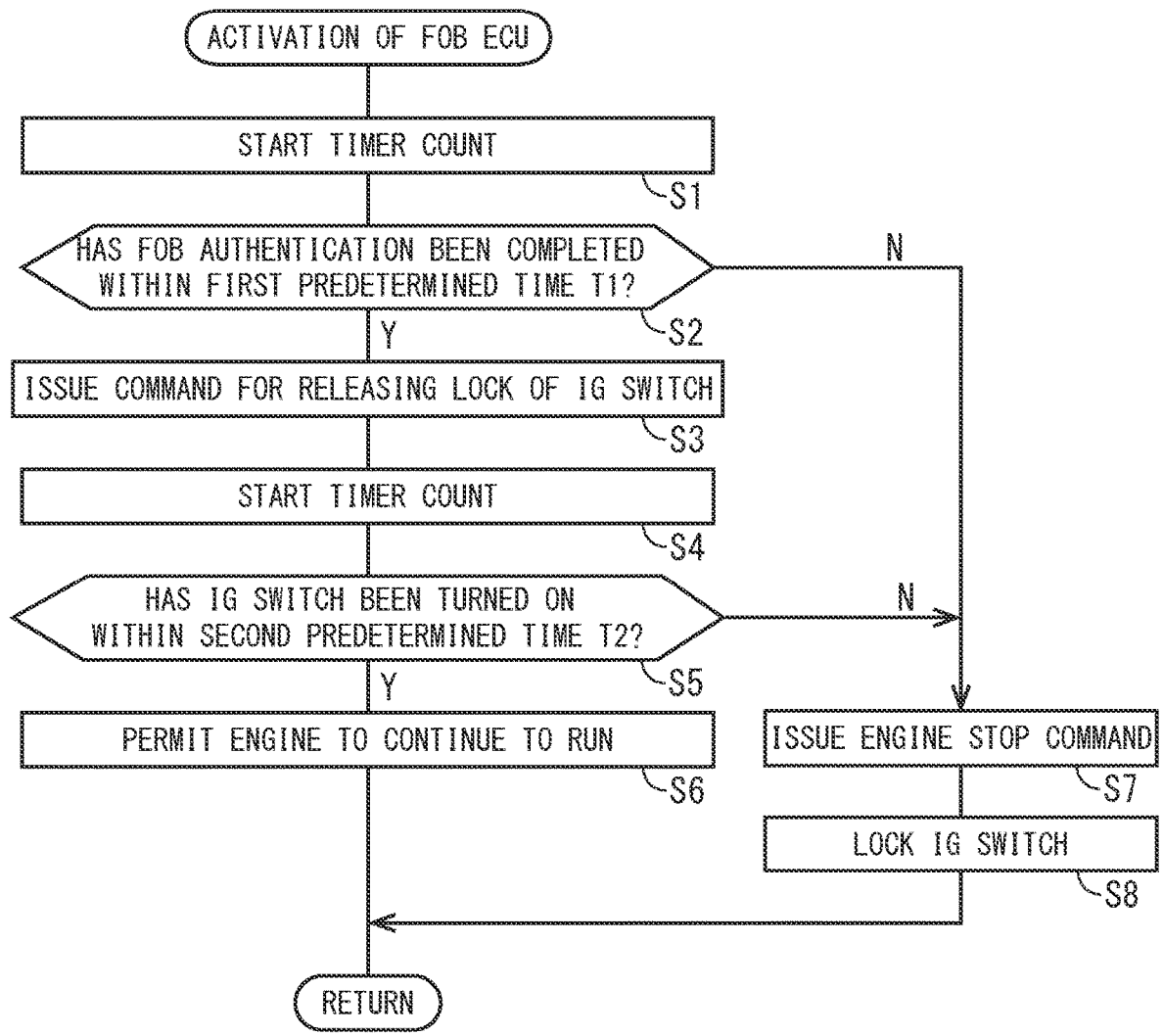
FIG. 3 is a flowchart showing a control procedure after a FOB ECU is activated.

FIG. 3 is a flowchart showing a control procedure after the FOB ECU is activated. The FOB ECU 30 is activated by power generated by kick operation.

In step S1, a timer count is started with the activation of the FOB ECU 31 as a trigger. In step S2, it is determined whether or not the authentication signal of the FOB key 70 has been authenticated before a first predetermined time T1 (for example, 0.5 seconds) has elapsed. That is, it can be determined whether or not the kick operation is performed by the owner of the FOB key 70 by executing authentication of the FOB key 70 immediately after the activation of the FOB ECU 30.

If the determination in step S2 is positive, it is determined that the kick operation is performed by the owner of the FOB key 70, and the procedure proceeds to step S3 where the FOB ECU 30 issues a command for releasing the lock of the ignition switch 35. In the subsequent step S4, a timer count is started with the command for releasing the lock of the ignition switch 35 as a trigger.

In step S5, it is determined whether or not the ignition switch 35 has been turned on, that is, switched from the off position to the on position, before a second predetermined time T2 (for example, 5 seconds) has elapsed. If the determination in step S5 is positive, it is determined that the owner of the FOB key 70 has an intention of driving, and the procedure proceeds to step S6 where the engine is permitted to continue to run. Thus, a series of controls are completed.

On the other hand, if the determinations in steps S2 and S5 are negative, the procedure proceeds to step S7 where an engine stop command is issued. Then, in step S8, the locking mechanism 60 locks the ignition switch 35, and the series of controls end. In other words, if the determination in step S2 is negative, it is determined that the kick operation is performed by a person who does not carry the FOB key 70, and even if the engine is once started, the engine is immediately stopped. If the determination in step S5 is negative, it is determined that, although the kick operation is performed by the owner of the FOB key 70, he/she does not have an intension of driving, and the engine is stopped.

Figure 4:
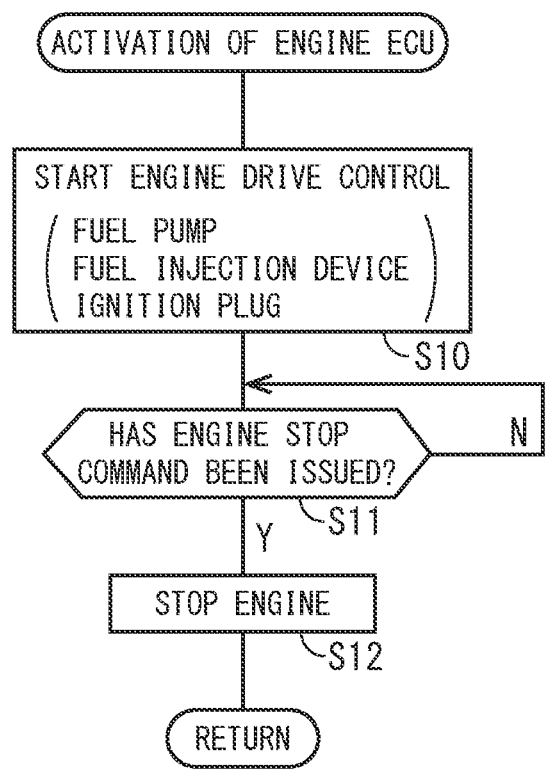
FIG. 4 is a flowchart showing a control procedure after an engine ECU is activated.

FIG. 4 is a flowchart showing a control procedure after the engine ECU is activated. When the kick starter 14 is operated, the engine ECU 31 and the FOB ECU 30 are almost simultaneously activated, although it is preferable that the engine ECU 31 is activated earlier than the FOB ECU 30. In step S10, engine drive control such as driving the fuel pump, a fuel injection device, and an ignition plug is started, and when sufficient energy is generated by the kick operation, idling is continued, and electric power from the ACG is supplied to the FOB ECU 30 and the engine ECU 31 during idling.

In step S11, it is determined whether or not the engine stop command is issued because the authentication of the FOB key 70 is not completed before the lapse of the first predetermined time T1 from the activation of the FOB ECU 31, or the ignition switch 35 is not switched to the on position before the lapse of the second predetermined time T2 (for example, 5 seconds) after the release of the lock of the ignition switch 35 by the locking mechanism 60.

If the determination in step S11 is positive, the procedure proceeds to step S12 where the engine E is stopped. Thus, the series of controls end. If the determination in step S11 is negative, the procedure returns to the determination in step S11.

As described above, the authentication device for saddled vehicle according to the present invention is configured such that, due to operating the kick starter 14, electric power generated by the generator 50 is supplied to the FOB ECU 30 and the engine ECU 31, and the engine E is started, and when the authentication signal is not authenticated before the lapse of the first predetermined time T1 after the FOB ECU 30 is activated, the engine E is stopped. With this configuration, the engine E is routinely started by the operation on the kick starter 14, and when a person who does not carry the FOB key 70 operates, the engine E is stopped. Thus, in a vehicle in which a battery is in a discharged state or in a vehicle not equipped with a battery, the startup of the engine can be completed by one kick operation by the owner of the FOB key 70.

Further, the FOB ECU 30 stops the engine E when the ignition switch 35 is not switched to the on position before the lapse of the second predetermined time T2 after the lock of the ignition switch 35 is released. Therefore, when the ignition switch 35 is not switched to the on position, it can be determined that the rider has no intension of driving, and unnecessary fuel consumption can be suppressed by stopping the engine E.

Further, the first predetermined time T1 is set to be shorter than the second predetermined time T2. Therefore, when the authentication signal is not authenticated, the engine is stopped immediately, whereby it is possible to save fuel and to allow the rider adequate time to operate the ignition switch 35 after the authentication of the FOB key 70.

Note that the configuration of the motorcycle, the configurations of the kick starter and the ignition switch, the configuration of the ACG starter motor as the generator, the configuration and structure of the FOB key, and the like are not limited to those in the abovementioned embodiment, and various modifications are possible. The authentication device according to the present invention is not limited to be applied to a motorcycle, and can be applied to a saddled tricycle or quadricycle, or the like. In addition, in a vehicle capable of push starting, the vehicle may be started and authenticated by power generated by push starting.

REFERENCE SIGNS LIST

1 motorcycle (saddled vehicle)
14 kick starter
30 FOB ECU (control unit)
31 engine ECU
32 battery
35 ignition switch 50 ACG starter motor (generator)
60 locking mechanism
70 FOB key
E engine
T1 first predetermined time
T2 second predetermined time

The invention claimed is:

1. An authentication device for saddled vehicle applied to a saddled vehicle including a FOB key that transmits an authentication signal, a control unit that receives and authenticates the authentication signal, a kick starter that starts an engine, and a generator that rotates in conjunction with an operation on the kick starter, the authentication device being configured such that, due to operating the kick starter, electric power generated by the generator is supplied to the control unit, and the engine is started, wherein the control unit stops the engine when the authentication signal is not authenticated before a lapse of a first predetermined time after the control unit is activated.

2. The authentication device for saddled vehicle according to claim 1, wherein the saddled vehicle is provided with a locking mechanism that locks an ignition switch at an off position, the locking mechanism releases lock of the ignition switch when the authentication signal is authenticated, and the control unit stops the engine when the ignition switch is not switched to an on position before a lapse of a second predetermined time after the lock is released.

3. The authentication device for saddled vehicle according to claim 2, wherein the first predetermined time is set shorter than the second predetermined time.

* * * * *